INVENTOR.
KILIAN H. BRECH
BY:
Ervin B. Steinberg

INVENTOR.
KILIAN H. BRECH
BY:
Erwin B. Steinberg

United States Patent Office 3,554,016
Patented Jan. 12, 1971

3,554,016
PULSE-ECHO ULTRASONIC TEST APPARATUS WITH SIGNAL SELECTION AND STORAGE MEANS
Kilian H. Brech, Norwalk, Conn., assignor to Branson Instruments, Incorporated, Stamford, Conn., a corporation of Delaware
Filed May 23, 1968, Ser. No. 731,455
Int. Cl. G01n 29/04
U.S. Cl. 73—67.9                                   16 Claims

ABSTRACT OF THE DISCLOSURE

A pulse-echo ultrasonic apparatus designed for testing workpieces which are at a high temperature includes a signal selection and signal storage circuit for selecting from a plurality of cyclic test readings the one signal responsive to minimum time lapse between search pulse and echo signal. The selected signal is stored over an extended period of time, permitting a display meter to be actuated and read. The arrangement necessitates only briefest contact between the transducer probe and the hot workpiece.

BACKGROUND OF THE INVENTION

This invention refers to pulse-echo ultrasonic test apparatus and, more specifically, has reference to a pulse-echo test apparatus adapted for testing workpieces which are at an elevated temperature.

The standard pulse-echo ultrasonic test method is well known in the art and is based on the apparatus disclosed in U.S. Pat. No. 2,280,226 dated Apr. 21, 1942 issued to F. A. Firestone. Essentially, a piezoelectric transducer means adapted to receive electrical energy from a high frequency pulse generator is coupled to an exposed surface of a workpiece. Periodically an electrical pulse is applied to the transducer which converts the applied electrical signal to a sonic impulse which is propagated from the surface of the workpiece into the workpiece. Responsive to the sonic pulse intercepting an acoustic discontinuity, such as a flaw or the rear surface of the workpiece, a reflection or echo signal is produced which subsequently is received by the transducing means and converted into an electrical signal. The transit time of the sonic signal from the workpiece surface to the acoustic discontinuity and the subsequent receipt of the echo signal is a measure of the distance of the acoustic discontinuity, or flaw, from the workpiece surface at which the transducing means is applied. For a further description of the pulse-echo test method and apparatus, reference is made to "Ultrasonic Engineering" (book) by Julian R. Frederick, John Wiley & Sons, Inc., 1965, chapter 7, page 244, entitled "Flaw Detection."

Several problems present themselves when hot workpieces are to be tested, particularly workpieces exhibiting temperatures in the range from 500 to 1000° F. The piezoelectric transducer material used for converting electrical energy to sonic energy, typically lithium sulfate, is sensitive to heat and readily destroyed by excessive temperature. Therefore, in order to thermally insulate the piezoelectric material from the hot workpiece surface, a liquid or solid coupling means, also known as delay line, is normally interposed between the piezoelectric material and the hot workpiece surface and the sonic energy traverses the coupling means along its path between the transducer and the workpiece. Liquid coupling means, in one form, comprise a confined water column as shown for instance in U.S. Pat. No. 3,242,723 issued to Dwight J. Evans, entitled "Ultrasonic Transducer," issued Mar. 29, 1966. Since the workpiece engaging end of such a contained water column is usually closed off by a flexible diaphragm or a seal made of heat sensitive synthetic material, the contact between the transducer probe comprising the piezoelectric material fitted with the contained water column is limited to a relatively short duration. The free-flowing water column constitutes another form of a liquid coupling means and is disclosed for instance in U.S. Pat. 2,751,783 issued to D. C. Erdman dated June 26, 1956, entitled "Apparatus for Coupling Ultrasonic Waves" and in U.S. Pat. 3,154,890 issued to J. H. Lemelson dated Nov. 3, 1964 entitled "Ultrasonic Tool." These latter devices are relatively cumbersome and messy to use, unavoidably spilling water over the hot workpiece, and have found only limited application. Other attempts to provide insulation and protect the piezoelectric material from prolonged heat exposure are shown in U.S. Pat. No. 3,315,520 issued to E. H. Carnevale et al., dated Apr. 25, 1967 and in a similar patent to the same inventors No. 3,354,699 dated Nov. 28, 1967. The arrangement disclosed in the last two patents is feasible only for fixed installations and lacks portability.

A simpler and far more portable intermediate coupler arrangement comprises a solid bar made of thermoplastic material, e.g. methyl methacrylate, polyimide or polystyrene. While a transducer probe fitted with this type of coupling means is easy to manipulate and, therefore, permits intermittent tests at workpiece temperatures of nearly 500–600° F., several annoying problems still remain. The plastic material used for the intermediate coupler, by virtue of its thermal contact with the hot object surface, changes its temperature and tends to soften after a few seconds. This change in temperature and consistency also changes the acoustic transmission characteristic of the coupling means. Specifically, an increase in temperature lowers the acoustic transmission velocity, thereby lengthening the time lapse between the initial pulse and the receipt of the subsequent echo signal. This change, in turn, provides a reading which either denotes a far greater thickness of the workpiece than that which actually exists, or that the location of a flaw is farther removed from the entrant surface than actually is the case. Moreover, during repetitive test readings a steady drift manifests itself as the temperature of the coupling material increases. In some instances, a bucket of cold water is carried around for cooling off the transducer probe between tests.

Additionally, in order to provide adequate coupling between the transducer probe and the object surface a couplant film is required. This film suitably comprises water or glycerine, or more recently a silicone oil or grease. However, when the workpiece is at an elevated temperature of several hundred degrees the coupling film quickly evaporates or oozes out, thereby rendering further measurement impossible.

As will be apparent it is very difficult, therefore, to provide accurate pulse-echo readings with workpieces at an elevated temperature. For instance, at a temperature of 1000° F. a true reading appears for only a minute fraction of a second which time is much too short for indicating a thickness reading on a conventional direct reading meter, such as a taut band meter. The latter indicating instrument is particularly suited and desirable for corrosion measurements since, unlike with a cathode ray tube, very little skill is required for reading minimum wall thickness, and unskilled personnel may be used to periodically check the thickness of hot pipes, tanks, digesters, boilers, and the like.

SUMMARY OF THE INVENTION

The present invention discloses an arrangement wherein only a momentary contact between the transducer probe and the hot object surface is required. During this brief period of contact a plurality of signals are developed, each signal having an amplitude which is responsive to the transit time of the sonic pulse between the transducer probe and an acoustic discontinuity. The only reading which is significant is the signal which is characterized by the lowest amplitude, corresponding to the shortest transit time of the sonic signal and, therefore, denoting minimum material thickness or distance to a flaw. A selection circuit together with a storage means selects from the plurality of signals the one signal having the lowest amplitude and stores this selected signal for a sufficient length of time to enable it to be displayed on a meter. In the absence of an echo signal, such as may be caused by lack of good contact or improper coupling between the transducer means and the workpiece, the amplitude of respective signals becomes very large and a previously stored minimum reading is not disturbed. As the couplant film evaporates or as the temperature of the coupling means increases, subsequent readings indicating a longer transit time of the sonic energy are disregarded from the measuring circuit. In this way the present invention permits contact with a hot workpiece for a fraction of a second, which time is insufficient to cause a significant heat rise in the couplant film and in the transducing means, yet which time, assuming a normal pulse repetition rate in the order of 2,000 cycles per second, is adequate to obtain several hundred discrete measurements. The selection circuit discerns the signal having the lowest amplitude, such signal being then stored and processed for display on a meter. Reset means are provided to cancel a stored signal so as to ready the circuit for a new testing cycle, using a new plurality of output signals from which once again the signal having the lowest amplitude is selected.

As will be apparent, the arrangement described overcomes the heretofore existing difficulties arising from prolonged contact between the transducer probe and a hot workpiece. Also, the novel arrangement avoids the generation of inaccurate readings due to drift cause by heating of the transducer probe and loss of the couplant film. Still further, the piezoelectric element and its front and backing materials remain cool and in prime operating condition.

OBJECTS OF THE INVENTION

One of the principal objects of this invention is, therefore, the provision of a new and improved pulse-echo test apparatus which is designed to overcome many of the important limitations and disadvantages of the prior art device.

Another important object of this invention is the provision of a new and novel pulse-echo ultrasonic test apparatus adapted for testing workpieces which are at an elevated temperature, for instance in the range from 500 to 1000° F.

Another important object of this invention is the provision of a pulse-echo ultrasonic test apparatus for testing hot workpieces, requiring only very momentary contact between the transducer probe and the hot workpiece for obtaining a reading.

A further object of this invention is the provision of a pulse-echo ultrasonic test apparatus for providing a plurality of output signals, each signal being responsive to the transit time of ultrasonic energy in the workpiece, and including a selection circuit for selecting the significant signal and means for storing and displaying such selected signal.

A still further and other object of this invention is the provision of a pulse-echo ultrasonic test apparatus specifically suited for testing very hot objects and including selection and storage means for selecting only the most significant one of a plurality of cyclically obtained output signals, and means coupled for storing and displaying a value commensurate with such selected signal.

Further and still other objects of this invention will be more readily apparent by reference to the following description when taken in conjunction with the accompanying figures in which:

DESCRIPTION OF THE PREFERRED EMBODIMENT FIG. 1

Figure 1:
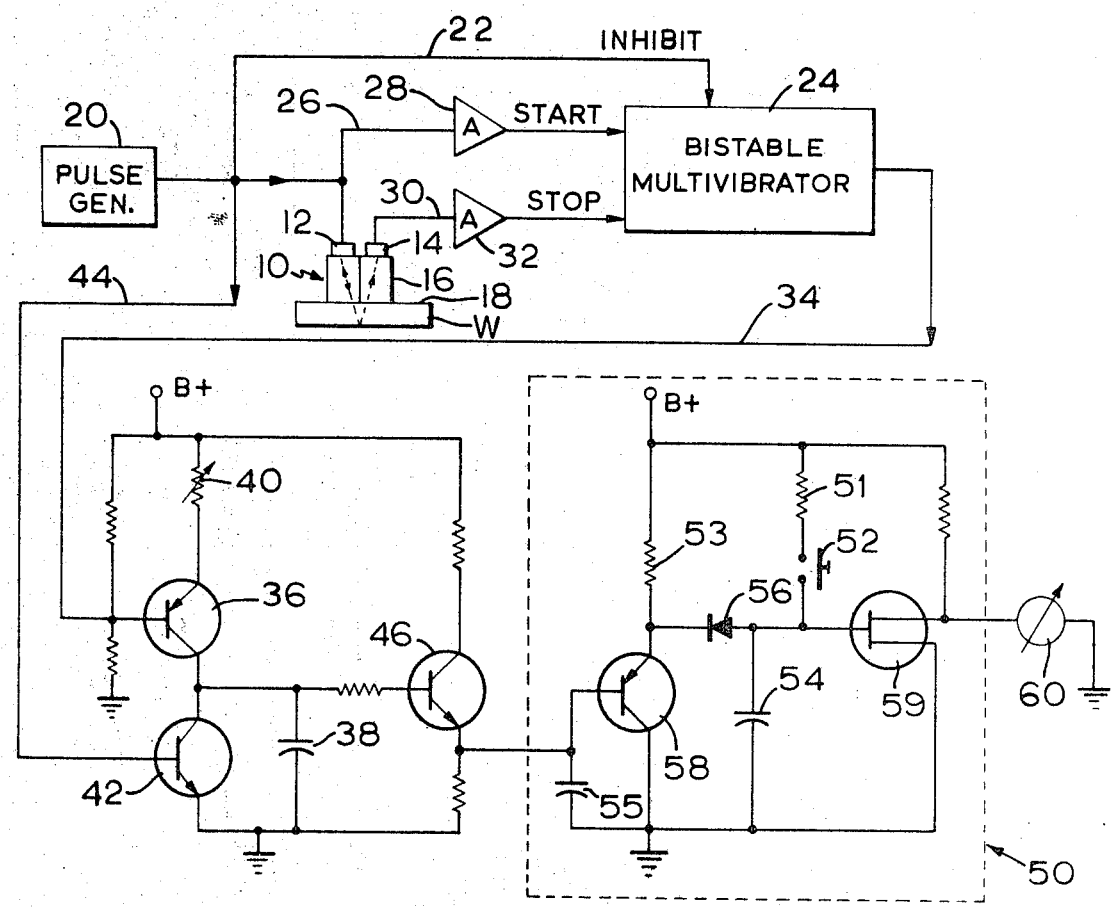
FIG. 1 is a schematic circuit diagram of a preferred embodiment of the present invention.

Referring now to the figures and FIG. 1 in particular, numeral 10 refers to a dual transducer probe comprising essentially an electro-acoustic transmitting transducer 12, a similar receiving transducer 14, both made of piezoelectric material, and a solid coupling means 16, made of thermoplastic material, adapted to engage the frontal surface 18 of a workpiece W which is to be tested by the ultrasonic pulse-echo test method. The dual transducer probe 10 most suitably is constructed in accordance with the design shown in U.S. Pat. No. 3,325,781 dated June 13, 1967, issued to Robert V. Harris, entitled "Dual Transducer Probe for Ultrasonic Testing."

The transmitting transducer 12 is coupled also to an electrical pulse generator 20 for periodically receiving a high frequency electrical pulse signal. A typical pulsing rate as used in ultrasonic pulse-echo test apparatus is 2,000 cycles per second, but it will be understood that a higher or a lower pulsing rate may be used without deviating from the principle of the invention.

When the pulse generator 20 supplies a pulse signal to the transmitting transducer 12, the generator concurrently supplies also a signal via the conductor 22 to a bistable multivibrator 24 in order to prevent operation of the multivibrator at this moment and to zeroize the multivibrator. The multivibrator 24 is connected also to receive a start signal from the transducer 12 via the conductor 26 and an amplifier 28. Similarly, the receiving transducer 14 is connected to send a stop signal to the multivibrator 24 via the conductor 30 and amplifier 32. The multivibrator 24 provides an output signal whose duration is responsive to the time interval between the receipt of an echo signal at the transmitting transducer 12 and the subsequent receipt of an echo signal at the receiving transducer 14.

The output signal from the multivibrator 24 is applied via the conductor 34 as a gating signal to the transistor 36 which is coupled as a switching means in series with a signal storage capacitor 38. While the multivibrator 24 provides an output signal, constant current flows from the terminal B+ through the variable resistor 40 and the transistor 36 to the capacitor 38, causing the capacitor to be charged to a peak voltage which is commensurate with the duration of the output signal from the multivibrator. Hence, the capacitor becomes charged with voltage whose amplitude is responsive to the time lapse between the receipt of two consecutive echo signals. The charge in the capacitor 38 is periodically discharged by means of a transistor 42 connected to ground and in parallel with the capacitor 38, and receiving a gating signal via conductor 44. The transistor 42 is connected via conductor 44 to the pulse generator 20 for causing the capacitor 38 to be discharged at the time a signal is sent from the pulse generator 20 to the dual transducer probe 10.

The rate of rise of the signal across the capacitor 38 is adjustable by the variable resistor 40, thus providing a means for compensating for the differences in sound velocity of the materials under test. The signal stored across the capacitor 38 is coupled via a transistor 46 to a signal selection and storage circuit 50 which, in turn, is connected to a display device 60 for displaying the measured thickness of the workpiece under test. Most suitably, the meter 60 is a taut band meter with calibrations in units of thickness, such as units of inch or millimeter.

The signal selection and storage circuit 50 comprises a signal storage capacitor 54 which can be charged to B+ potential by momentary operation of a push button switch 52, thereby establishing current flow from B+ through resistor 51 and push button switch 52 to the capacitor 54. If the amplitude of the signal stored across the capacitor 54 exceeds the amplitude of the signal stored across the capacitor 38, the capacitor 54 discharges its potential to the lower amplitude via the rectifier diode 56 and the transistor 58, thus assuming a voltage amplitude commensurate with that across the capacitor 38. A capacitor 55 maintains the capacitor 54 charged during the very brief period in which the capacitor 38 is discharged by current conduction through the transistor 42.

The display meter 60 is coupled to receive a signal commensurate with the stored potential across the capacitor 54 and is coupled to the capacitor via a high impedance device 59, typically an insulated field effect transistor. Also, the diode 56 is selected to be one having a high back resistance (typically 100 megohm) so that the time constant of the storage circuit which includes the capacitor 54 (typically 10 mfd.), the back resistance of rectifier 56, and the leakage resistance of transistor 59 is sufficiently large to maintain the potential stored across capacitor 54 constant for an extended period of time, typically permitting only a one percent voltage drop over a period of 10 seconds. A period of this duration is sufficient to perform a measurement, obtain proper pointer deflection on the meter 60, and visually read the meter dial.

OPERATION OF CIRCUIT PER FIG. 1

Figure 2:
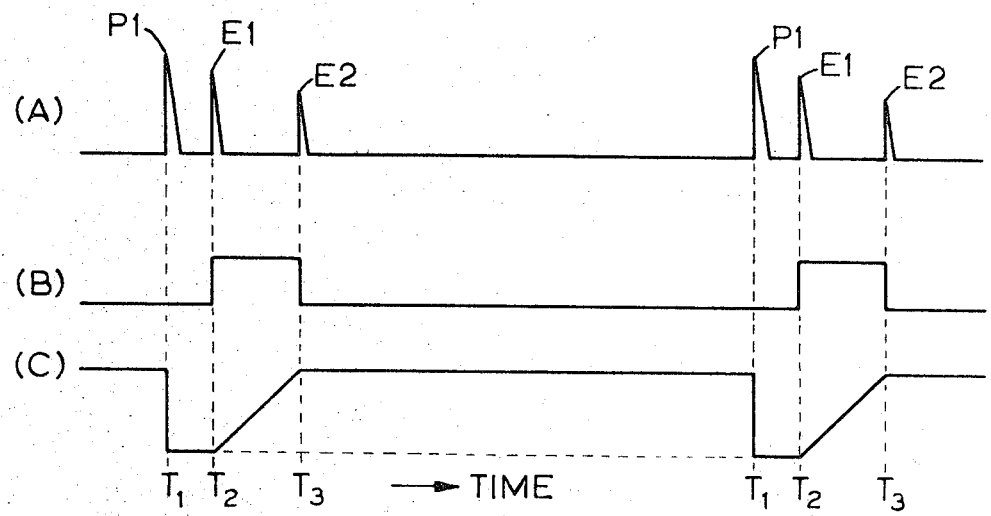
FIG. 2 is a graph showing typical wave shapes versus time in the circuit per FIG. 1.

Operation of the circuit per FIG. 1 may be visualized as follows, see also FIG. 2:

At the time $T_1$ the pulse generator 20 sends a signal P1 to the transducer 12 which via the coupling means 16 and a thin couplant film (not shown) is coupled to the frontal surface 18 of the workpiece W. Simultaneously the signal is applied via the conductor 44 also to the transistor 42, causing the capacitor 38 to be discharged. Moreover, a signal is applied also via the conductor 22 as an inhibit signal to the multivibrator 24 for preventing the multivibrator from starting the timing cycle at this particular point in time.

The transducer 12 converts the electrical pulse applied to an ultrasonic search signal which is transmitted via the interposed coupling means 16 toward the workpiece W. As the transmitted sonic search signal encounters the interface between the coupling means made of thermoplastic material and the front or entrant surface 18 of the workpiece, a reflection or echo signal is produced which after travelling in the rearward direction through the coupling means 16 is sensed by the transducing means 12, being reconverted to an electrical signal and transmitted via the conductor 26 and the amplifier 28 to the multivibrator 24 for starting the timing signal provided by the multivibrator. The receipt of this interface echo signal E1 and the starting of the multivibrator 24 occurs at the time $T_2$ indicated in FIGS. 2A and 2B.

As the search pulse continues its travel from the front surface 18 of the workpiece W to the rear surface, it encounters either the rear surface itself or a flaw, thus producing a second echo signal which after travel through the workpiece and the coupling means 16 is sensed by the receiving transducer 14. The receiving transducer 14 converts the reflector echo signal into an electrical signal E2 at time $T_3$, FIG. 2A, this signal being conducted via the conductor 30 and amplifier 32 as a stop signal to the multivibrator 24. Therefore, the multivibrator as clearly seen in FIG. 2B provides an output signal which is responsive to the time lapse between the receipt of a first echo signal E1 at the transducer 12 and the subsequent second echo signal E2 received by the transducer 14, and, when related to the workpiece W, this time lapse is responsive to the transit time of the sonic signal within the workpiece from the entrant surface 18 to an acoustic discontinuity. As the output signal from the multivibrator 24 is applied to the transistor 36 the capacitor 38 is charged, time interval $T_2$ to $T_3$, FIG. 2B, and since the transistor 36 in conjunction with the resistor 40 supplies constant current to the capacitor, a ramp voltage signal is created, see FIG. 2C. The capacitor becomes charged to an amplitude which is proportional to the time interval between $T_2$ and $T_3$. In the absence of a second echo signal E2, the capacitor 38 is charged from the terminal B+ to a peak voltage which is in excess of a maximum as selected by the maximum predetermined time lapse and resulting material thickness to be explored. The signal across the capacitor 38 is held constant until the next cyclically generated pulse provided by the pulse generator 20, time $T_1$ at which time the capacitor 38 is quickly discharged, FIG. 2C, and then obtains once again a steady signal corresponding to the time lapse between two consecutive echo signals discerned at the transducers 12 and 14.

In order to obtain a reading on the meter 60 corresponding to the transit time of the sonic energy in the workpiece W, the capacitor 54 initially must be charged to B+ potential by momentary closing of switch 52. The signal across capacitor 54 is applied via the transistor 59 to the meter 60, causing the meter 60 to deflect to a maximum reading, again in excess of the maximum predetermined test range. Responsive to the discharge path established via the rectifier 56 and the transistor 58, the capacitor 54 will discharge to the lowest steady signal value across the capacitor 38 and, in view of the long time constant provided in the circuit 50 as explained heretofore, the signal across the capacitor 54 will remain substantially constant and displayed by the meter 60. As the direct current voltage across the capacitor 38 changes, the circuit 50 will select at all times the lowest one of the plurality of cyclically generated direct current voltages across the capacitor 38 and assume a value commensurate with this lowest value. If the cyclic generated direct current voltage across the capacitor 38 increases resulting from faulty contact between the transducer probe 10 and the frontal surface 18, as may be caused by insufficient engagement force, evaporation of the couplant film, removal of the transducer probe from the frontal surface and the like, the rectifier 56 prevents the capacitor 54 from becoming charged to a higher potential from the charge existing across the capacitor 38. Therefore, the capacitor 54 always is charged to the lowest potential across the capacitor 38, and only the signal existing across the capacitor 54 is displayed by the meter 60. After a test reading has been obtained, the capacitor 54 can be reset by charging it to its maximum value, this being accomplished by momentary closing of switch 52.

PREFERRED PROCEDURE FOR TESTING HOT WORKPIECES

When testing the wall thickness of a very hot workpiece W the operation may be carried out as follows: The dual transducer probe 10 is manually held and a sufficient amount of couplant material is applied to the frontal surface of the transducer probe 10. Push button switch 52 is briefly depressed, thus charging the capacitor 54 and obtaining full deflection on the meter 60. The probe 10 then is quickly brought in contact with the hot workpiece W and slightly rocked if an uneven surface prevails. As the contact pressure increases and good contact is achieved, the cyclically obtained potentials across the capacitor 38 decreases from a maximum signal, denoting no contact, to a minimum value signifying good contact.

Subsequently, the singals across the capacitor 38 increase once again due to evaporation of couplant film or heating of the coupling means. The voltage across the capacitor 54 decreases from a maximum value to the minimum value apparent across the capacitor 38. Capacitor 54 maintains the stored signal substantially constant for a sufficient amount of time, several seconds, to permit the meter 60 to adjust itself and to be read by an operator. Assuming that the pulse generator is operating at a pulsing rate of 2,000 cycles per second, only momentary contact with the workpiece W needs to be effected, for instance a fraction of a second since during such a time interval several hundred ramp signals across the capacitor 38 will be generated from which the circuit 50 is able to select and store the minimum signal for display on the meter 60. After removal of the transducer probe 10 from momentary contact with the workpiece W and reading of the meter 60, the above steps are repeated one or more times.

It will be clearly apparent that only a very momentary contact between the transducer probe and a hot workpiece is required and that such contact engagement can be repeated many times without effecting a significant heating of the probe itself. The minimum reading, which is the only true reading provided and obtained from a plurality of test signals, is stored for reading after contact between the transducer probe and the workpiece has been broken. As described heretofore, the time constant of the circuit enables the output signal to be maintained usbstantially constant, having only a negligible error over a period of many seconds.

For removing the selection and storage circuit 50 from the entire arrangement, switch 52 is held in the closed circuit position and the heretofore known test apparatus is presented.

ALTERNATIVE EMBODIMENTS PER FIGS. 3 AND 4

Figure 3:
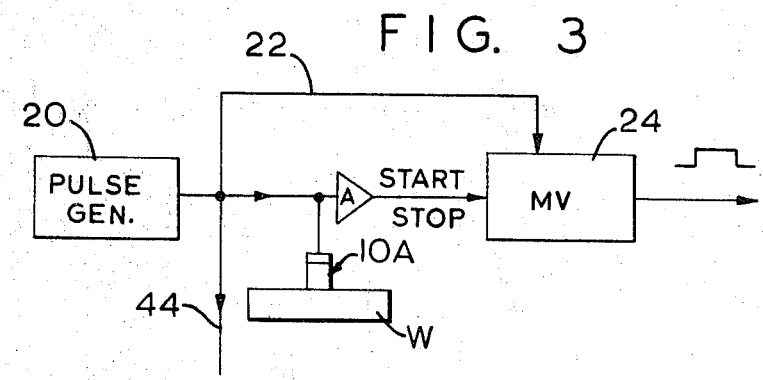
FIG. 3 is a schematic diagram of a portion of FIG. 1 showing, however, an alternative transducer arrangement.

An alternative arrangement is shown in FIG. 3 wherein the transducer probe 10A comprises a single piezoelectric element coupled to a solid coupling means. This is a standard transducer probe and is well known to those skilled in the art. The remaining circuit remains the same.

Figure 4:
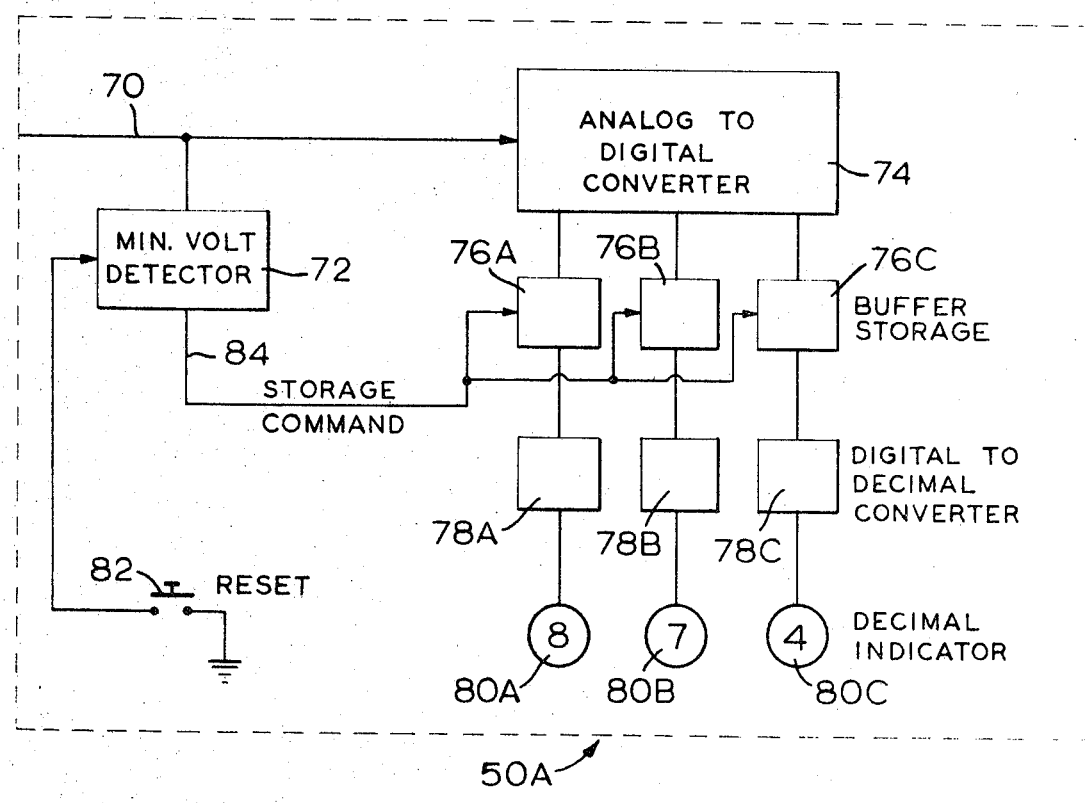
FIG. 4 is a schematic block diagram of an alternative embodiment of the selection and storage circuit shown in FIG. 1.

FIG. 4 depicts in block form a still further arrangement of a minimum signal selection and storage circuit 50A using digital information storage means. The direct current voltage signal whose amplitude is proportional to the time lapse between the two consecutive signals E1 and E2 is applied via a conductor 70 to a minimum voltage detector unit 72 and to an analog-to-digital converter unit 74. The analog-to-digital converter unit 74 is designed for three digits, thus providing three outputs, each being connected to a respective buffer storage unit 76A, 76B and 76C, one for each of the digits. Each buffer storage is connected, in turn, to a respective digital-to-decimal converter unit 78A, 78B and 78C. The output signals generated by the digital-to-decimal converter units are displayed on decimal indicator units 80A, 80B and 80C, typically Nixie tubes. A reset switch 82 is provided to reset the minimum voltage detector unit 72.

Operation of this selection and storage circuit 50A is as follows: The direct current amplitude of the ramp signal existing across capacitor 38 and appearing via a time gate (not shown) along conductor 70 is entered in the analog-to-digital converter unit 74 and also in the minimum voltage detector 72. The analog-to-digital converter unit 74 provides digital data which are entered in the buffer storage units 76A, 76B and 76C, transmitted also to the respective digital-to-decimal converter units 78A, 78B, 78C and displayed on the units 80A, 80B and 80C. A subsequent echo responsive signal reaches the minimum voltage detector unit 72 which by either analog or digital means determines whether such subsequent signal is of a lower amplitude than a previously received signal. If the signal is of greater amplitude the circuit remains in its set condition. If the signal is of a lower amplitude, a signal is sent via conductor 84 to the buffer storage units permitting the same signal, converted to digital information by the converter unit 74, to be entered in the storage units and transmitted also to the digital-to-decimal converters for display by the decimal indicators. If a subsequent signal is again of a higher amplitude, the minimum voltage detector fails to supply a storage command signal to the buffer storage units 76A, 76B and 76C, and, therefore, the previous signal remains displayed by the indicator units. When using a digital readout circluit of this type, there is no time responsive degradation of the displayed information and the display can be retained for an extended period of time. In order to perform a new test, the entire circuit is recycled by operating the reset switch 82.

It will be apparent that the embodiments described hereinabove provide an ultrasonic test circuit for testing of very hot objects requiring only the briefest contact between the transducer probe and the workpiece surface. A signal selection and storage means provided in the novel arrangement selects and stores only the most pertinent information which is made available for reading by operating personnel. This novel circuit arrangement not only increases the temperature range at which pulse-echo ultrasonic tests can be carried out, but also provides important protection to the equipment and to operating personnel since physical contact with the workpiece, previously extending over several seconds, is shortened quite considerably.

While there has been described and illustrated a certain preferred embodiment of the invention and several modifications have been indicated also, it will be apparent to those skilled in the art that still further and other modifications may be made without deviating from the principle and scope of this invention.

What is claimed is:

1. A pulse-echo ultrasonic test apparatus comprising: means for providing periodically an electrical pulse; electro-acoustic transducer means coupled to said electrical pulse means and adapted to be coupled to a frontal surface of a workpiece for periodically sending responsive to energization by said pulse means an ultrasonic search pulse into such workpiece and for receiving subsequently an echo signal responsive to the existence of an acoustic discontinuity intercepted by a respective search pulse;

electrical circuit means coupled to said transducer means for providing while said transducer means is coupled to the workpiece a plurality of electrical output signals, each such output signal being responsive to a time interval including the transit time of a respective search pulse within the workpiece from the frontal surface to such discontinuity;

further electrical circuit means coupled to said first-stated electrical circuit means for selecting by successive comparison of said plurality of output signals the one output signal which is responsive to the shortest time interval; and means coupled for indicating a value commensurate with the time interval of said selected signal.

2. A pulse-echo ultrasonic test apparatus comprising: electrical pulse means for providing periodically an electrical pulse;

electro-acoustic transducer means coupled to said electrical pulse means and adapted to be coupled by coupling means and a couplant film to a location at the frontal surface of a workpiece for periodically sending responsive to energization by said pulse means an ultrasonic search pulse through said coupling means and couplant film into such workpiece and for receiving subsequently an echo signal responsive to the existence of an acoustic discontinuity intercepted by a respective search pulse;

electrical circuit means coupled to said transducer means for providing while said transducer means is coupled to the workpiece a plurality of electrical output signals, each such output signal being responsive to a time interval which includes the transit time of a respective search pulse within the workpiece from the frontal surface to such discontinuity as discerned by said transducer means, and said circuit means in the absence of the receipt of a discontinuity responsive echo signal providing an output signal denoting a time interval in excess of a predetermined maximum value;

further electrical circuit means coupled to said first-stated electrical circuit means for selecting by successive comparison of said plurality of output signals the one signal denoting the shortest time interval and storing such selected signal, and means coupled for displaying a value commensurate with the time interval of said selected signal.

3. A pulse-echo ultrasonic test apparatus comprising:

electrical pulse means for providing periodically an electrical pulse;

electro-acoustic transducer means coupled to said electrical pulse means and adapted to be coupled by solid coupling means and a couplant film to a location at the frontal surface of a workpiece for periodically sending responsive to energization by said pulse means an ultrasonic search pulse through said coupling means and couplant film into such workpiece and for receiving subsequently an echo signal responsive to the existence of an acoustic discontinuity intercepted by a respective search pulse;

electrical circuit means coupled to said transducer means for providing while said transducer means is coupled to the workpiece a plurality of first electrical output signals, the amplitude of each such output signal being responsive to a time interval which includes the transit time of a respective search pulse within the workpiece from the frontal surface to such discontinuity, and said circuit means in the absence of the receipt of a discontinuity responsive echo signal providing an output signal having an amplitude in excess of a maximum as determined by the maximum desired time interval;

further electrical circuit means coupled to said first-stated electrical circuit means for providing a second output signal whose amplitude is responsive to a selected first output signal exhibiting the lowest amplitude among said plurality of first signals when these signals are successively compared, and means coupled for displaying a value commensurate with the amplitude of said second signal.

4. A pulse-echo ultrasonic test apparatus as set forth in claim 3, and means coupled in circuit with said further electrical circuit means and said display means for maintaining the amplitude of said second output signal substantially constant for a period of time sufficient for visual reading.

5. A pulse-echo ultrasonic test apparatus as set forth in claim 4, said means coupled in circuit with said further means and said display means maintaining the amplitude of said second signal constant for at least 0.5 second.

6. A pulse-echo ultrasonic test apparatus as set forth in claim 4, and a reset means coupled to said further electrical circuit means for cancelling said second output signal whereby to reset said apparatus for starting a new plurality of first output signals from which said second output signal is selected.

7. A pulse-echo ultrasonic test apparatus comprising:
(A) electrical pulse means for providing periodically an electrical pulse;
(B) electro-acoustic transducer means coupled to said electrical pulse means and adapted to be coupled by a thermally insulating solid coupling means and a couplant film to a location at the frontal surface of a workpiece for periodically sending responsive to energization by said pulse means an ultrasonic search pulse through said coupling means and couplant film into such workpiece and for receiving subsequently an echo signal responsive to the existence of an acoustic discontinuity intercepted by a respective search pulse;
(C) electrical circuit means coupled to said transducer means for providing while said transducer means is coupled to the workpiece an output signal whose amplitude is responsive to a time interval which includes the transit time of a respective search pulse from the frontal surface of the workpiece to the acoustic discontinuity and the return travel of a subsequent discontinuity responsive echo signal as sensed by said transducer means, and said circuit means in the absence of the receipt of an echo signal providing an output signal having an amplitude in excess of a maximum as determined by the maximum desired time interval;
(D) a further electrical circuit means coupled to said first-stated electrical circuit means and including:
 (1) electrical signal storage means for receiving an electrical signal whose amplitude is at least as high as a signal denoting said maximum time interval;
 (2) signal discharge means coupled to said storage means and to said first-stated electrical circuit means for sensing the amplitude of said output signal and for causing, when the amplitude of said signal in said storage means is of higher amplitude than that of said output signal, said storage means to discharge, causing the signal stored by said storage means to attain an amplitude commensurate with the amplitude of said output signal;
 (3) means coupled for precluding said storage means to be charged to a higher signal value by a signal from said first-stated electrical circuit means when the amplitude of said output signal is greater than that of said signal in said storage means;
 (4) means coupled in circuit with said storage means for providing a long time constant with respect to the periodic sending of said search pulse for maintaining the amplitude of a stored signal substantially constant for a period extending over several hundred pulses provided by said means for providing periodically said pulse to said transducer means, and
(E) means coupled to said storage means for displaying a value commensurate with the amplitude of the signal stored by said storag emeans.

8. A pulse-echo ultrasonic test apparatus as set forth in claim 7, said storage means including means for maintaining the amplitude of the stored signal substantially constant for at least 0.5 second.

9. A pulse-echo ultrasonic test apparatus as set forth in claim 7, and including means for periodically charging said electrical signal storage means with an electrical signal whose amplitude is at least as high as a signal denoting said maximum transit time.

10. A pulse-echo ultrasonic test apparatus as set forth in claim 9, said means for periodically charging including a switching means and a source of electrical potential.

11. A pulse-echo ultrasonic test apparatus as set forth in claim 7, said means for precluding said storage means to be charged to a higher signal value including a unidirectional current conducting means.

12. A pulse-echo ultrasonic test apparatus as set forth in claim 7, said storage means including an electrical capacitor.

13. A pulse-echo ultrasonic test apparatus as set forth in claim 12, said means for displaying being coupled to said storage means by a high impedance means.

14. A pulse-echo ultrasonic test apparatus as set forth in claim 13, said means for displaying comprising a taut band meter.

15. A pulse-echo ultrasonic test apparatus comprising:
first means for periodically sending an ultrasonic search pulse into a workpiece and adapted to receive responsive to each search pulse an echo signal arising from an acoustic discontinuity intercepted by such search pulse;
second means coupled to said first means for providing output signals, each such output signal being responsive to the time lapse between the sending of a respective search pulse into the workpiece and the receipt of the associated echo signal, and
selection and display means coupled to said second means for receiving said output signals and selecting by successive comparison of the received output signals the output signal responsive to the shortest time lapse and displaying a value commensurate with the time interval of said selected output signal.

16. The method for testing the thickness of a workpiece by the ultrasonic pulse-echo method comprising the steps:
generating periodically an ultrasonic search signal;
applying said periodically generated ultrasonic search signals to a coupling means disposed at a predetermined location of the surface of the workpiece means transmitting such signals through said coupling means and a couplant film into the workpiece;
awaiting the receipt of echo signals generated by an acoustic discontinuity disposed below the surface of the object and intercepted by said search signals;
providing output signals, each output signal being responsive to the time interval between the transmitting of a respective search signal and the subsequent receipt of an echo signal which is responsive to the transmitted search signal;
selecting by successive comparison of a plurality of said output signals the one output signal characterized by the shortest time interval;
temporarily storing said selected output signal, and displaying a value commensurate with the time interval of said stored signal.

References Cited

UNITED STATES PATENTS

| | | | |
|---|---|---|---|
| 3,048,031 | 8/1962 | Beaujard | 73—67.9 |
| 3,237,446 | 3/1966 | Wood | 73—67.9 |
| 3,334,622 | 8/1967 | Brech | 73—67.9X |
| 3,423,992 | 1/1969 | Dory | 73—67.9 |

FOREIGN PATENTS

| | | | |
|---|---|---|---|
| 933,564 | 8/1963 | Great Britain | 73—67.9 |

RICHARD C. QUEISSER, Primary Examiner

A. E. KORKOSZ, Assistant Examiner